United States Patent
Kverneland

[15] 3,675,856
[45] July 11, 1972

[54] MACHINE FOR DISTRIBUTING SEED, FERTILIZER AND OTHER GRAIN OR POWDER MASSES

[72] Inventor: Finn Kverneland, Brumunddal, Norway
[73] Assignee: Globus Maskinfabrikk A/S, Brumunddal, Norway
[22] Filed: Aug. 10, 1970
[21] Appl. No.: 62,444

[30] Foreign Application Priority Data

Sept. 1, 1969 Norway ................................3487/69

[52] U.S. Cl. ..............................................239/654, 239/687

[51] Int. Cl. .........................................................A01c 15/04

[58] Field of Search ..................222/373; 239/688, 687, 683, 239/655, 654; 308/183

[56] References Cited
UNITED STATES PATENTS

| | | | |
|---|---|---|---|
| 321,879 | 7/1885 | Amundson et al. | 239/683 |
| 3,167,958 | 2/1965 | Hollmann | 308/183 X |

*Primary Examiner*—Robert B. Reeves
*Assistant Examiner*—John P. Shannon, Jr.
*Attorney*—McGlew and Toren

[57] ABSTRACT

An impeller for controlling the flow of grain or pulverulent materials between a container containing such materials and a centrifugal fan for distributing said materials over a wide area, the impeller feeding a predetermined quantity per revolution to the fan.

4 Claims, 3 Drawing Figures

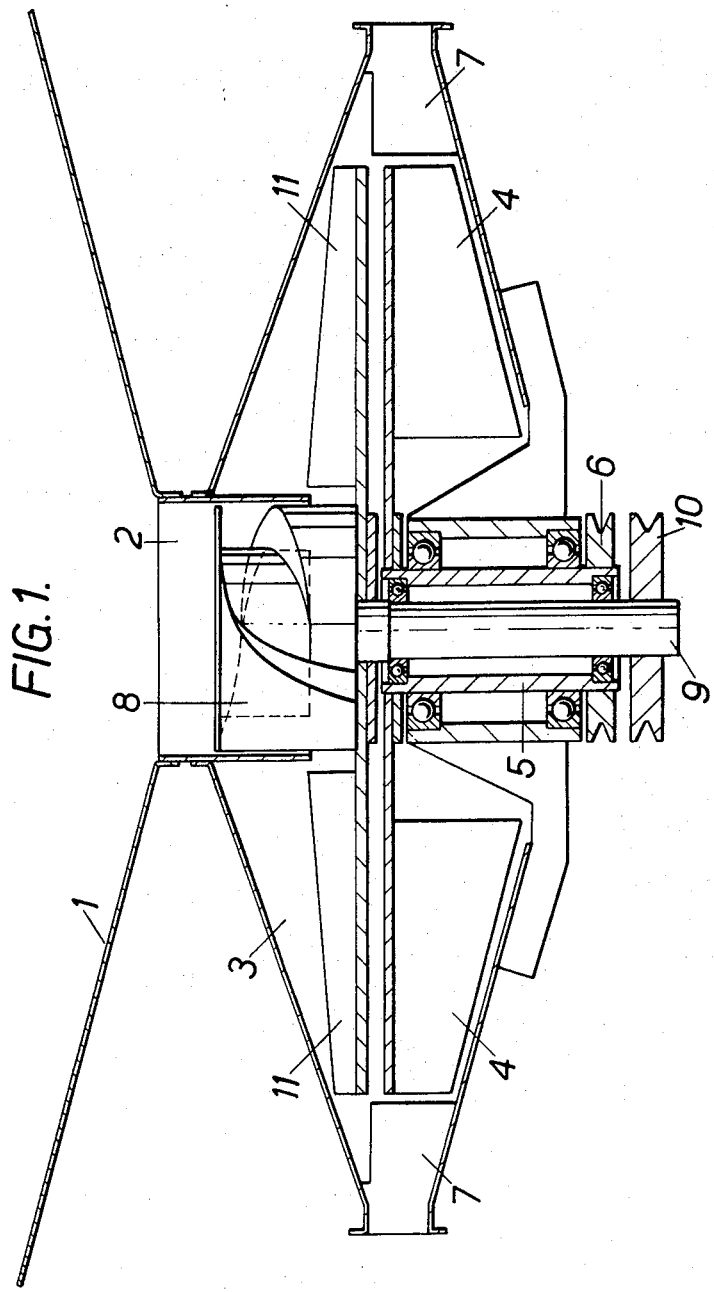

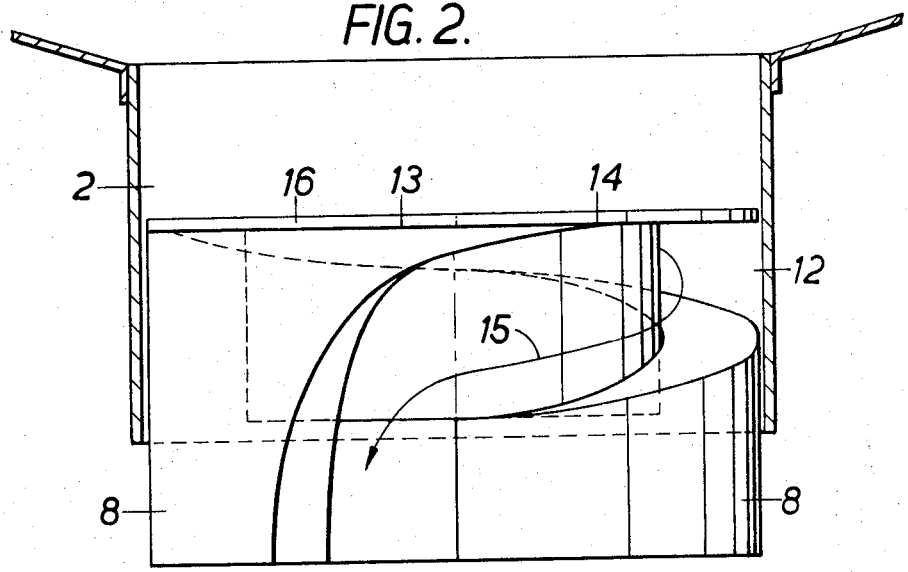
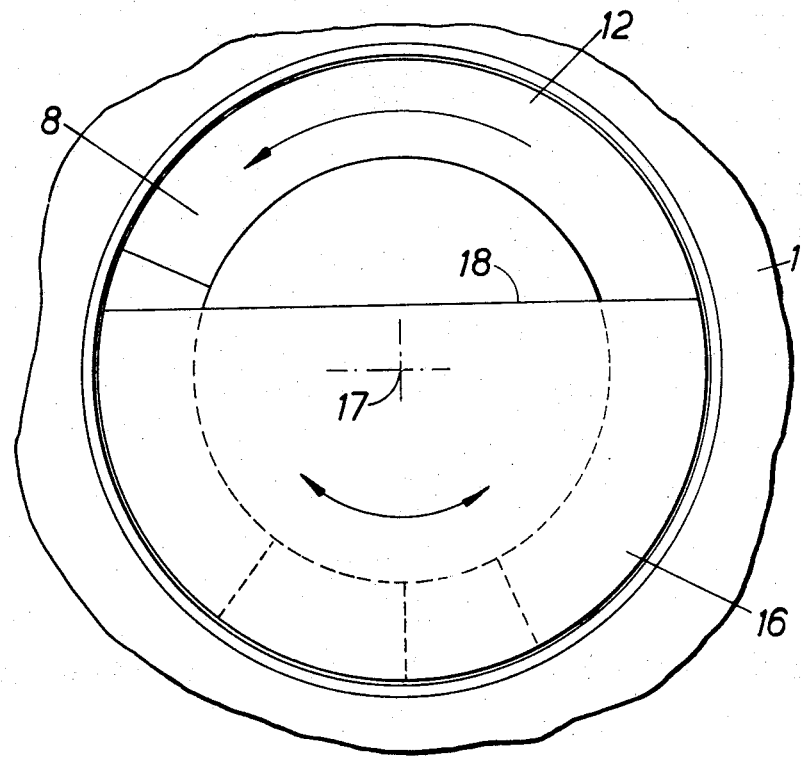

MACHINE FOR DISTRIBUTING SEED, FERTILIZER AND OTHER GRAIN OR POWDER MASSES.

The present invention relates to an improvement in sowing machine, fertilizer distributors and similar machines for distribution of grain and pulverulent masses in predetermined quantities per square unit over large areas.

A convenient manner of transporting seed and fertilizer from the bottom of a tank or container is to provide air streams generated by a centrifugal fan beneath the tank of the container from which the seed or fertilizer is removed, and uniform dispensing is achieved in accordance with the invention in that an impeller is disposed in the passage extending from the bottom of the container to the centrifugal fan, and on operation of the machine the said impeller rotates and discharges a determined amount of seed or fertilizer per revolution. The amount discharged may be continuously and very accurately adjusted when the inlet to the helical channel or channels of the impeller is made smaller or larger by means of a rotatable flap or plate.

The invention thus relates to an improvement in a machine for distributing seed, fertilizer and other grain or pulverulent masses, said machine comprising a tank or container for the mass to be distributed and a centrifugal fan to further transport the mass from the container, and it is substantially characterized in that a rotatable impeller is mounted in a passage between the bottom of the container and the centrifugal fan.

A suitable embodiment example is characterized in that the inlet to the helical channel or channels of the impeller is adjustable.

A further feature of the invention resides in the fact that, on the end facing towards the centrifugal fan, the impeller is provided with outwardly directed blades. It is an advantage, moreover, that the impeller is rotatable independent of the centrifugal fan.

In order that the invention may be more readily understood, it is further described in the following with reference to the drawing, where:

FIG. 1 shows a section through the bottom of a tank or container for grain or pulverulent mass, and appurtenant discharge means constructed in accordance with the invention.

FIG. 2 shows a section through an impeller which, in accordance with the invention, is disposed in the outlet from the bottom of the tank, viewed from the side, and FIG. 3 shows the same as FIG. 2 seen from above.

On FIG. 1, the bottom of the tank is designated by 1 and is provided with an outlet 2 for conveying for example seed into a chamber 3 wherein there is located a centrifugal fan 4, the shaft 5 of which being rotatably mounted for rotation of the fan by means of a V-belt pulley 6. The chamber 3 has a plurality of outlets 7 leading to known parts of a sowing machine or fertilizer distributor for distribution of the discharged mass over the working width of the machine.

The centrifugal fan 4 generates powerful air streams which entrain the grain or pulverulent mass conveyed downwardly from the lower portion of the container through the bottom 2 thereof, and in order to ensure that the said discharge is uniform an impeller 8 is mounted in the passage 2 from the container to the centrifugal fan 4, said impeller being further described in the following with reference to FIG. 2. In the example illustrated, the impeller is secured to a shaft 9 which is rotatably mounted in the shaft 5 of the centrifugal fan 4 and is provided with a V-belt pulley 10, so that the impeller 8 and the fan 4 are capable of rotating independently at respective speed.

In order to ensure that the grain or pulverulent mass conveyed through the passage 2 by the impeller 8 is introduced into the powerful airstream of the centrifugal fan 4, the impeller is provided at its lower end with outwardly directed vanes 11 which rotate with the impeller and convey the grain or pulverulent mass to the air of the centrifugal fan in the area of the outlet 7 of the housing 3.

The impeller 8 is shown more in detail on FIG. 2, and in this particular embodiment it is provided with a helical channel 12 initiating at the upper, plane end 13 of the impeller 8 at a sharp edge 14. The grain or pulverulent mass impelled into the chamber 3 during rotation of the impeller follows the path indicated by the arrow 15. At the said upper, plane end 13 an adjustable plate 16 is mounted which is viewed from above on FIG. 3. The plate is adapted to be rotated about the center 17 of the impeller 8 and, in that the plate has a straight edge 18 which is spaced from the center 17, it is possible by adjustment of the plate 16 in relation to the impeller 8 to regulate the dimension of the inlet opening to the helical channel 12 and thereby to determine the amount of the mass conveyed to the chamber 3 per revolution of the impeller.

Having described my invention, I claim:

1. Improvement in a machine for distributing feed, fertilizer and other grain or powder masses comprising a container for the mass to be distributed having an outlet opening in its lower end, a downwardly depending outlet passage connected at its upper end to the outlet opening from said container, a centrifugal fan located at the lower end of said outlet passage, a first shaft in alignment with said outlet passage, said centrifugal fan mounted on said first shaft for rotation therewith, a second shaft positioned within said first shaft and independently rotatable thereof, an impeller located within said outlet passage between the outlet opening from said container and said centrifugal fan and said impeller mounted on said second shaft for rotation therewith, a disc mounted on and extending transversely of said second shaft and located at the lower end of said outlet passage, said disc extending radially outwardly from said outlet passage and separating said outlet passage from said centrifugal fan, a plurality of outwardly directed vanes positioned on the side of said disc facing the lower end of said outlet passage, said disc and vanes arranged to rotate with said impeller, a helical channel located within said impeller and terminating at its lower end at said disc for directing the material from said container to said vanes on said disc and the radially outer edges of said vanes being aligned above the radially outer edges of said centrifugal fan for uniformly directing the material into the path of said centrifugal fan at its radially outer edge, and adjustable means located at the inlet end of said helical channel for adjusting the inlet opening to said helical channel for determining the mass of material conveyed to said vanes on said disc for revolution of said impeller.

2. Improvement in a machine, as set forth in claim 1, wherein said adjustable means comprises a plate rotatable relative to said impeller and disposed perpendicularly of said second shaft at the upper end of said helical channel in said impeller, so that by rotating said plate the dimension of the opening into said helical channel can be varied.

3. Improvement in a machine, as set forth in claim 2, wherein said plate covering a portion of the upper end of said impeller and being rotatable about the axis of said second shaft, said plate having a chordally extending edge relative to the axis of said second shaft spaced from both the axis of said second shaft and the circumferential periphery of said impeller.

4. Improvement in a machine, as set forth in claim 1, wherein wall means forming a chamber enclose said outlet passage, said impeller, said disc and said centrifugal fan and its circumferential periphery is spaced radially outwardly from the circumferential periphery of said disc and said centrifugal fan, and said chamber having outlets located at its circumferential periphery spaced radially outwardly from the radial edges of said centrifugal fan and disc.

* * * * *